United States Patent

[11] 3,609,118

| [72] | Inventors | Eberhard Pilz<br>Bobingen;<br>Klaus Hoheisel, Wiesbaden-Biebrich;<br>Eberhard Werner, Wiesbaden-Biebrich, all of Germany |
|---|---|---|
| [21] | Appl. No. | 780,559 |
| [22] | Filed | Dec. 2, 1968 |
| [45] | Patented | Sept. 28, 1971 |
| [73] | Assignee | Kalle Aktiengesellschaft<br>Wiesbaden-Biebrich, Germany |
| [32] | Priority | Dec. 4, 1967 |
| [33] | | Germany |
| [31] | | P 16 94 549.6 |

[54] POLYESTERS STABILIZED WITH A PHOSPHONITE
2 Claims, No Drawings

[52] U.S. Cl. ........................................................ 260/45.7
[51] Int. Cl. ....................................................... C08g 51/58
[50] Field of Search ........................................ 260/45.7 P, 45.7 PS, 75 P

[56]  References Cited
UNITED STATES PATENTS

| 3,053,809 | 9/1962 | Linville ......................... | 260/75 |
| 3,061,583 | 10/1962 | Huhn et al. .................. | 260/45.7 |

Primary Examiner—Donald E. Czaja
Assistant Examiner—R. A. White
Attorney—James E. Bryan ABSTRACT: This invention relates to a thermostabilized linear polyester or copolyester containing 0.001 to 5 percent by weight, based on the weight of the diester component, of phenyl diphenoxy phosphine as a thermostabilizer.

POLYESTERS STABILIZED WITH A PHOSPHONITE

The present invention relates to the thermostabilization of linear polyesters or copolyesters, i.e. polymeric compounds containing repeating ester groupings in their chains, which are formed in the presence of known catalysts by esterification of organic dicarboxylic acids or by reesterification of esters of organic dicarboxylic acids with glycols, followed by polycondensation, and which are particularly suitable for the production of filaments, fibers, films, coatings or the like. High-grade linear polyesters are obtained from terephthalic acid dimethylester and ethyleneglycol, using the known reesterification and polycondensation catalysts.

In addition to terephthalic acid, other aliphatic or aromatic dicarboxylic acids or disulfonic acids also may be employed as acid components in the production of polyesters. The following are exemplary: phthalic acid, isophthalic acid, oxalic acid, adipic acid, sebacic acid, azelaic acid, naphthalene-2,6-disulfonic acid, and diphenyl dicarboxylic acid. In addition to ethyleneglycol, aliphatic, cycloaliphatic or aromatic dials having from two to 14 carbon atoms are used as the diol component, e.g. diethylene glycol, butylene glycol, polyethylene glycol, cyclohexane dimethanol, neopentylene glycol, hydroquinone and dihydroxy napthalene. The dicarboxylic acid component and the diol component may consist of individual compounds or of mixtures of compounds.

Linear polyesters are distinguished by numerous advantages which permit their application and processing into films, fibers, or the like. However, all polyesters or copolyesters prepared from the most varied units and with quite different catalysts have a disadvantage which considerably impairs their processing qualities and possibilities of application, viz their decomposition behavior, particularly under thermal stress. In addition to thermal decomposition, hydrolytic and oxidative decomposition also must be considered.

An improvement of the thermostability of polyester products already has been achieved by the addition of phosphorous acid or of organic compounds containing phosphorus, such as triphenyl phosphite and triphenyl phosphate, or ammonium phosphite and ammonium phosphate. However, these phosphorus-containing compounds have the disadvantage of being volatile or of disintegrating under the conditions prevailing during polycondensation, so that the desired optimum improvement of heat stability is not achieved.

The present invention improves the thermostability of polyesters by the addition of suitable stabilizers.

In accordance with the invention, the thermostabilized linear polyesters or copolyesters, in particular polyethylene terephthalate, contain at least one compound of the general formula

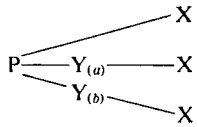

wherein $a$ and $b$ are 0 or 1, $Y$ is oxygen or sulfur, and $X$ is a straight-chain, branched, or cyclic saturated hydrocarbon residue with up to 18, preferably four to 10 carbon atoms, especially butyl or octyl residues, or phenyl residues which may be substituted by aliphatic hydrocarbon residues, as the thermostabilizing agent, in quantities ranging from 0.001 to 5 percent by weight, based on the quantity of diester component used as a precursor of the polyester.

Particularly favorable results are obtained when the polymer compounds contain from 0.01 to 0.5 percent by weight of the stabilizing agent according to the invention, calculated upon the quantity of diester component used.

Further, it has been found that the alkyl, aryl, or alkylaryl phosphines according to the invention and the corresponding phosphinic acid esters or thiophosiphinic acid esters have good stabilizing effect against oxidation and heat, which effect by far exceeds that resulting from the stabilizers hitherto known, viz phosphorous acid or phosphites and phosphates. Further, they have the advantage that they are chemically inert, as compared with phosphorus acid, are less volatile, and do not form undesirable side products which may interfere with the preparation of the polyester.

The stabilizer is introduced into the reaction mixture either prior to or during polycondensation, by adding it together with glycols or alone. Advantageously, it is added, while stirring, before the end of the polycondensation process, at temperatures ranging from 215° to 250° C.

The alkyl, aryl or alkylaryl phosphines to be used according to the present invention and the corresponding phosphinic acid esters or thiophosphinic acid esters are chemically inert and presumably are incorporated in the polyester chain during the polycondensation process. In addition to deactivating the catalyst, they have a reducing effect and favorably influence the quality of the end product in that light, colorless products are produced.

The invention will be further illustrated by reference to the following examples. In the examples, the percentages by weight refer to the quantity of the diester component employed, in particular dimethyl terephthalate.

EXAMPLE 1 a. Six hundred parts by weight of dimethyl terephthalate and 480 parts by weight of ethylene glycol, to which 0.0767 percent by weight of calcium acetate has been added, are heated in a boiler with stirring and then reesterified while distilling off methanol over a heated reflux condenser. Towards the end of the reesterification process, $2.5 \times 10^{14}$ mole of tributyl phosphine per mole of dimethyl terephthalate, dissolved in ethylene glycol, is added at a temperature between 215° and 250° C.; 0.04 percent by weight of antimony trioxide ($Sb_2O_3$) is added as a condensation catalyst. While separating excess ethylene glycol, the temperature in the boiler is raised to 255° C., and at this temperature evacuation is begun and continued until a pressure of 0.3 Torr. is finally reached. In accordance with a predetermined heating program, the temperature is raised to 280° C. concurrently with the evacuation process. Thermostable, colorless products are thus obtained which have an intrinsic viscosity of 0.68.

Under analogous conditions, colorless polyesters with an intrinsic viscosity of 0.68 may also be produced by using b. $2.5 \times 10^{14}$ mole of tri-n-octylphosphine per mole of dimethyl terephthalate, or c. $2.5 \times 10^{14}$ mole of phenyl dibutyl phosphine per mole of dimethyl terephthalate, as stabilizers.

The thermostability of the polyester products thus obtained is evaluated as follows:

Approximately 10 g. of the granulated polyester are heated to 300° C. in an electrically heated metal block having a hole 10 mm. wide and a 1 mm. hole-type nozzle which can be unscrewed. After a dwell of 20 minutes in the metal block at a temperature of 300° C., the melt is extruded by means of a plunger. This thermally decomposed polyester is then investigated with regard to its percentage decrease in viscosity and increase of carboxyl groups. The results are given in the table below.

EXAMPLE 2

Six hundred parts by weight of dimethyl terephthalate and 480 parts by weight of ethylene glycol, to which 0.0767 percent by weight of calcium acetate has been added, are reesterified as described in example 1. Towards the end of the reestrification process, $2.5 \times 10^{14}$ mole of phenyl diphenoxy phosphine per mole of dimethyl terephthalate is added at a temperature of 215° C. Polycondensation is performed as described in example 1. Thermostable, colorless products are thus obtained which have an intrinsic viscosity of 0.68. Their thermostability is evaluated as described in example 1.

EXAMPLE 3

Six hundred parts by weight of dimethyl terephthalate and 480 parts by weight of ethylene glycol, to which 0.023 percent of zinc acetate has been added, are reesterified as described in example 1. Towards the end of the reesterification process, $1.57 \times 10^{14}$ mole of phenyl diphenoxy phosphine per mole of dimethyl terephthalate is added at a temperature ranging from 215° to 250° C. Polycondensation is effected as described in example 1, using 0.04 percent by weight of antimony trioxide. Thermostable, colorless products are obtained which have an intrinsic viscosity of 0.68. Their thermostability is evaluated as described in example 1.

EXAMPLE 4

Six hundred parts by weight of dimethyl terephthalate and 480 parts by weight of ethylene glycol, to which 0.023 percent of zinc acetate has been added, are reesterified as described in example 1. Towards the end of the reesterification process, $1.57 \times 10^{14}$ mole of tributyl phosphine per mole of dimethyl terephthalate is added at a temperature of between 215° and 250° C. The polycondensation process is performed as described in example 1. Thermostable, colorless products are thus obtained which have an intrinsic viscosity of 0.68. Their thermostability is evaluated as described in example 1.

EXAMPLE 5

A polycondensation process is effected as described in example 4, using $2.0 \times 10^{14}$ mole of phenyl dibutyl phosphine per mole of dimethyl terephthalate as a stabilizer. In this case, too, a colorless product is obtained which has an intrinsic viscosity of 0.68. The thermostability of the product is evaluated as described in example 1.

TABLE 1

| | | Stabilizer | | | Decomposition Behavior after 20 min. at 300 °C. | |
|---|---|---|---|---|---|---|
| | | | | | Decrease of Viscosity | Increase of COOH groups |
| | Catalyst, percent by weight* | | | Percent (by weight)* | Mole per mole of DMT | In percent |
| Example 1a | Ca(CH₃COO)₂ Sb₂O₃ | 0.0767% 0.04 % | tributylphosphine | 0.026 | $2.5 \cdot 10^{-4}$ | 19 | 120 |
| Example 1b | Ca(CH₃COO)₂ Sb₂O₃ | 0.0767% 0.04 % | Tri-n-octyl-phosphine | 0.048 | $2.5 \cdot 10^{-4}$ | 17.4 | 161 |
| Example 1c | Ca(CH₃COO)₂ Sb₂O₃ | 0.0767% 0.04 % | phenyldibutyl-phosphine | 0.028 | $2.5 \cdot 10^{-4}$ | 18 | 147 |
| Example 2 | Ca(CH₃COO)₂ Sb₂O₃ | 0.0767% 0.04 % | phenyldiphenoxy-phosphine | 0.036 | $2.5 \cdot 10^{-4}$ | 16 | 119 |
| Comparison Values | Ca(CH₃COO)₂ Sb₂O₃ | 0.0767% 0.04 % | H₃PO₃ | 0.011 | $2.5 \cdot 10^{-4}$ | 19.2 | 135 |
| Example 3 | Zn(CH₃COO)₂ Sb₂O₃ | 0.023% 0.03 % | phenyldiphenoxy phosphine | 0.0237 | $1.57 \cdot 10^{-4}$ | 20 | 109 |
| Example 4 | Zn(CH₃COO)₂ Sb₂O₃ | 0.023% 0.03 % | tributylphosphine | 0.0163 | $1.57 \cdot 10^{-4}$ | 21.4 | 128 |
| Example 5 | Zn(CH₃COO)₂ Sb₂O₃ | 0.023% 0.03 % | phenyldibutyl-phosphine | 0.03 | $2 \cdot 10^{-4}$ | 22 | 146 |
| Comparison Values | Zn(CH₃COO)₂ Sb₂O₃ | 0.023% 0.03 % | triphenylphosphite | 0.025 | $1.57 \cdot 10^{-4}$ | 21.8 | 155 |
| Comparison Values | Zn(CH₃COO)₂ Sb₂O₃ | 0.023% | triphenylphosphite | 0.18 | $11.3 \cdot 10^{-4}$ | 25 | 622 |

*The percentages are calculated upon the quantity of dimethyl terephthalate (DMT) employed.

What is claimed is:

1. A thermostabilized linear polyester containing about 0.001 to 5 percent by weight, based on the weight of the diester component used as a precursor of the polyester, of phenyl diphenoxy phosphine as a thermostabilizer.

2. A shaped article made from a thermostabilized linear polyester containing 0.001 to 5 percent by weight, based on the weight of the diester component used as a precursor of the polyester, of phenyl diphenoxy phosphine as a thermostabilizer.